United States Patent
He

(10) Patent No.: US 9,945,463 B2
(45) Date of Patent: Apr. 17, 2018

(54) TORQUE CONVERTER WITH AN EMBOSSED COVER FOR RECEIVING A CARRIER PLATE

(71) Applicant: Schaeffler Technologies AG & Co. KG, Herzogenaurach (DE)

(72) Inventor: Long He, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 206 days.

(21) Appl. No.: 14/950,722

(22) Filed: Nov. 24, 2015

(65) Prior Publication Data
US 2017/0146106 A1 May 25, 2017

(51) Int. Cl.
*F16H 45/02* (2006.01)
*F16D 13/52* (2006.01)

(52) U.S. Cl.
CPC ............ *F16H 45/02* (2013.01); *F16D 13/52* (2013.01); *F16H 2045/0221* (2013.01); *F16H 2045/0278* (2013.01); *F16H 2045/0284* (2013.01)

(58) Field of Classification Search
CPC ............... F16H 2045/0221; F16H 2045/0284
See application file for complete search history.

(56) References Cited

U.S. PATENT DOCUMENTS

| 4,868,365 A | 9/1989 | Farone et al. |
| 5,803,553 A * | 9/1998 | Wei ..................... B23P 11/025 |
| | | 301/63.103 |
| 7,841,174 B2 * | 11/2010 | Van Sickle ............ F16H 41/24 |
| | | 60/330 |
| 2001/0013454 A1 * | 8/2001 | Yamamoto .............. F16H 45/02 |
| | | 192/70.12 |
| 2007/0251788 A1 * | 11/2007 | Heck ..................... F16H 45/02 |
| | | 192/3.3 |
| 2011/0120829 A1 * | 5/2011 | Vanni .................... F16H 45/02 |
| | | 192/3.29 |
| 2014/0014453 A1 * | 1/2014 | Kawahara .............. F16H 45/02 |
| | | 192/3.28 |
| 2015/0152950 A1 | 6/2015 | Schrader et al. |
| 2015/0323052 A1 * | 11/2015 | Moore .................. F16H 41/24 |
| | | 60/364 |

OTHER PUBLICATIONS

Snapshot of "Torque Converters Explained" by Phil Parsons, dated May 2, 2013.*

* cited by examiner

*Primary Examiner* — Stacey Fluhart

(57) ABSTRACT

A torque converter, including: an axis of rotation; a cover arranged to receive torque from an engine and including a first indentation; an impeller shell fixedly secured to the cover; at least one impeller blade fixedly secured to the impeller shell; a turbine including a turbine shell and at least one turbine blade fixedly secured to the turbine shell; and a lock-up clutch including a first carrier plate fixedly secured to the cover and including a first protrusion disposed in the first indentation and a clutch plate non-rotatably connected to the first carrier plate.

17 Claims, 5 Drawing Sheets

US 9,945,463 B2

TORQUE CONVERTER WITH AN EMBOSSED COVER FOR RECEIVING A CARRIER PLATE

TECHNICAL FIELD

Disclosed herein is a torque converter having an embossed cover, in particular an embossed cover for receiving a protrusion for a carrier plate for a lock-up clutch, to fix a radial position of the carrier plate with respect to the cover.

BACKGROUND

FIG. 5 is a partial cross-sectional view of prior art torque converter 200. Torque converter 200 includes cover 202 and lock-up clutch 204 with outer carrier plate 206. Portion 206A of plate 206 is in contact with cover 202 and is welded to cover 202, for example by welds 208. Prior to welding, portion 206A is able to slide radially up and/or down with respect to cover 202, making exact positioning of plate 206 difficult. In addition, bending force is applied to plate 206 in direction RD when clutch 204 is closed. The only structure holding plate 206 to cover 202 is welds 208; therefore, the force in direction RD results in an unopposed shearing force on welds 208. Welds 208 are most susceptible to failure in response to a shearing force, rather than to a force in an axial direction.

SUMMARY

According to aspects illustrated herein, there is provided a torque converter, including: an axis of rotation; a cover arranged to receive torque from an engine and including a first indentation; an impeller shell fixedly secured to the cover; at least one impeller blade fixedly secured to the impeller shell; a turbine including a turbine shell and at least one turbine blade fixedly secured to the turbine shell; and a lock-up clutch including a first carrier plate fixedly secured to the cover and including a first protrusion disposed in the first indentation and a clutch plate non-rotatably connected to the first carrier plate.

According to aspects illustrated herein, there is provided a torque converter, including: an axis of rotation; a cover arranged to receive torque from an engine and including an indentation extending in a circumferential direction; an impeller shell fixedly secured to the cover; at least one impeller blade fixedly secured to the impeller shell; a turbine including a turbine shell and at least one turbine blade fixedly secured to the turbine shell; and, a lock-up clutch including a first carrier plate fixedly secured to the cover and including a protrusion disposed in the indentation and a clutch plate non-rotatably connected to the first carrier plate. A line parallel to the axis passes through the indentation and the protrusion.

According to aspects illustrated herein, there is provided a torque converter, including: an axis of rotation; a cover arranged to receive torque from an engine and including an indentation; an impeller shell fixedly secured to the cover; at least one impeller blade fixedly secured to the impeller shell; a turbine including a turbine shell and at least one turbine blade fixedly secured to the turbine shell; and a lock-up clutch including a first carrier plate including a protrusion disposed in the indentation and a clutch plate non-rotatably connected to the first carrier plate. The protrusion being disposed in the indentation fixes a radial position of the first carrier plate with respect to the cover.

BRIEF DESCRIPTION OF THE DRAWINGS

Various embodiments are disclosed, by way of example only, with reference to the accompanying schematic drawings in which corresponding reference characters indicate corresponding parts, in which.

DETAILED DESCRIPTION

Figure 1:
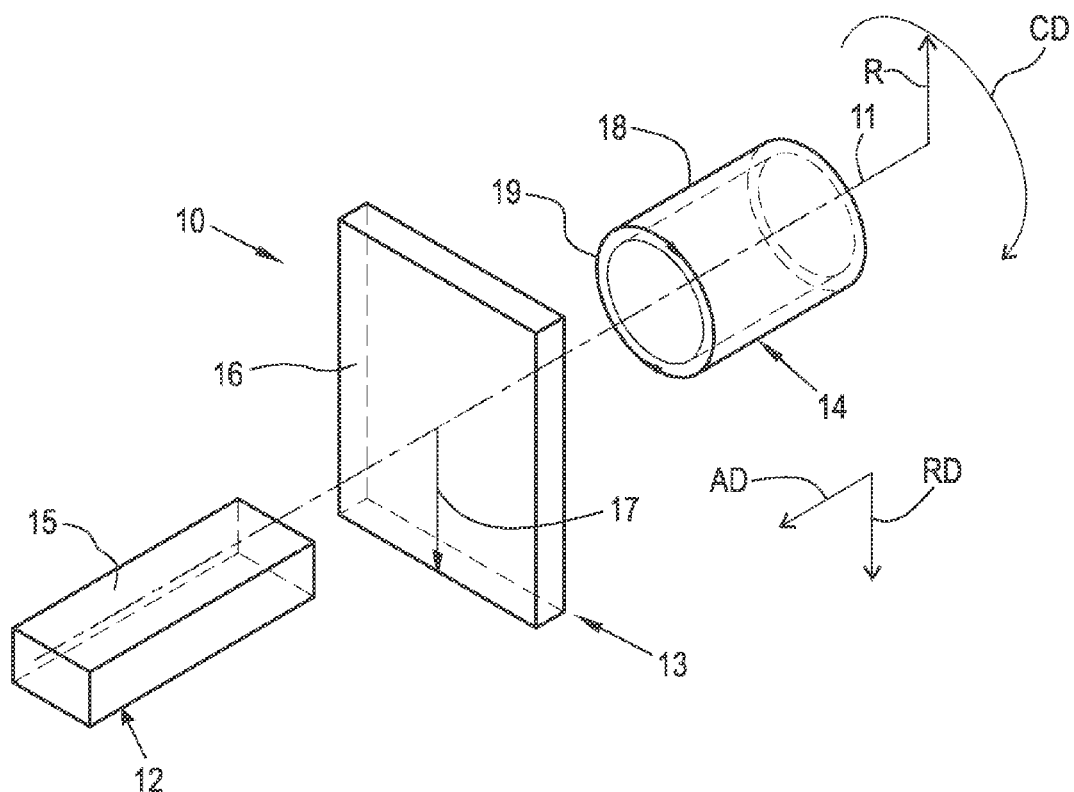
FIG. 1 is a perspective view of a cylindrical coordinate system demonstrating spatial terminology.

At the outset, it should be appreciated that like reference characters on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

By "non-rotatably connected" components we mean: any time one of the components rotates, all of the components rotate; and relative rotation between the components is not possible. Axial or radial displacement between components is possible, but not required.

FIG. 1 is a perspective view of cylindrical coordinate system 10 demonstrating spatial terminology. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
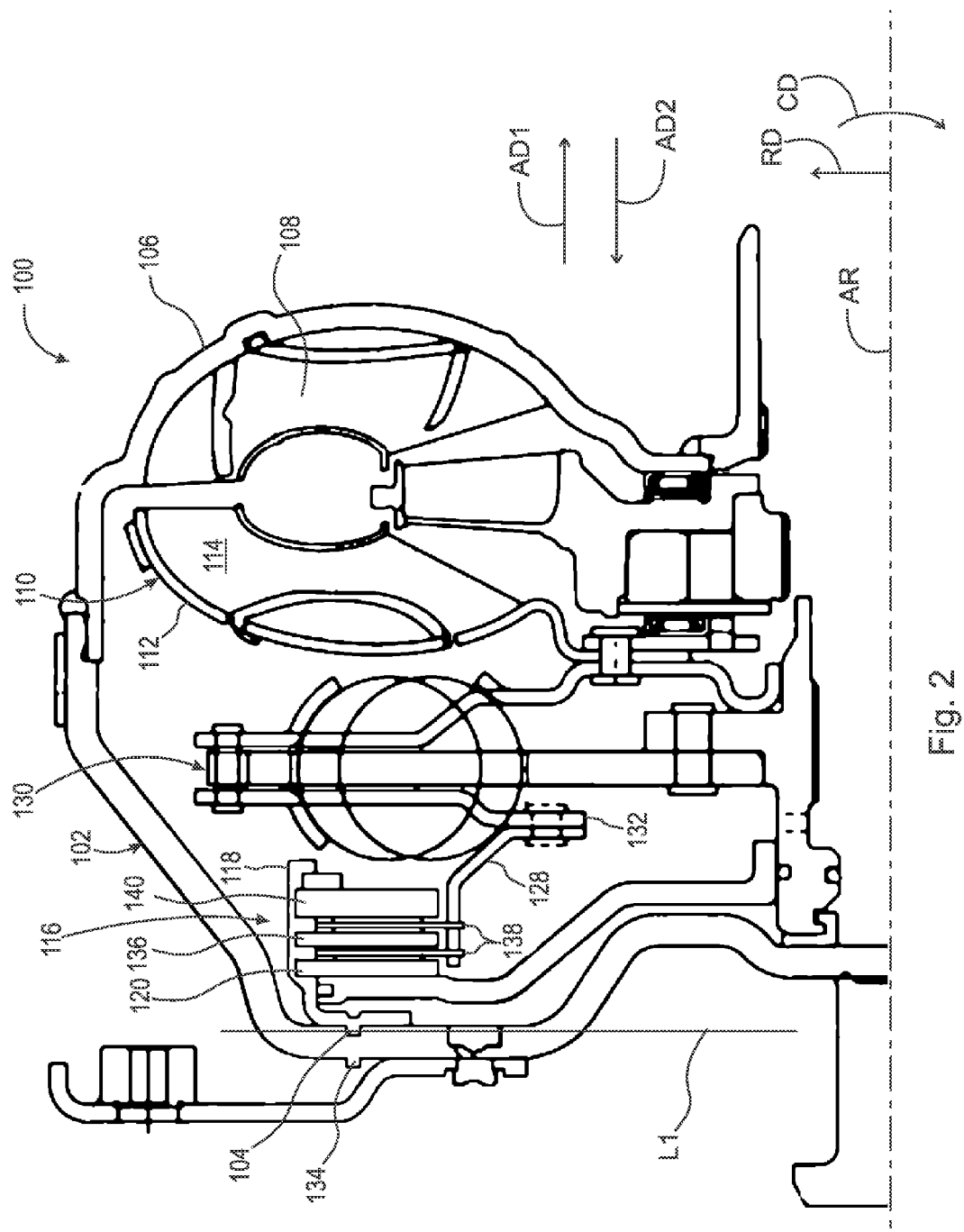
FIG. 2 is a partial cross-sectional view of a torque converter having an embossed cover for receiving a carrier plate.

FIG. 2 is a partial cross-sectional view of torque converter 100 having an embossed cover for receiving a carrier plate.

Figure 3:
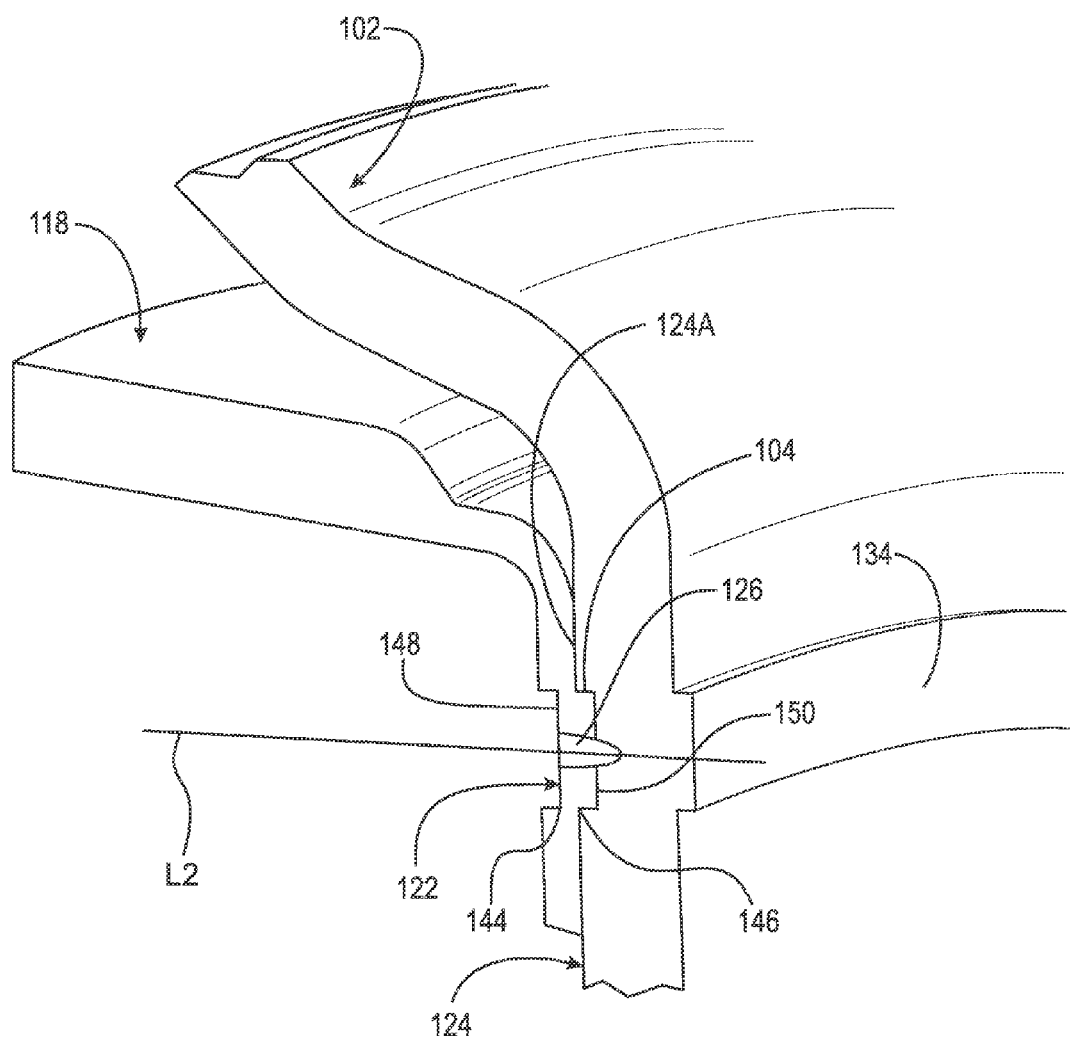
FIG. 3 is a perspective view of the cover and carrier plate shown in FIG. 2.

FIG. 3 is a perspective view of the cover and carrier plate shown in FIG. 2. The following should be viewed in light of FIGS. 2 and 3. Torque converter 100 includes: axis of rotation AR; cover 102 arranged to receive torque and including indentation 104; impeller shell 106 fixedly secured to cover 102; at least one impeller blade 108 fixedly secured to impeller shell 106; turbine 110 including turbine shell 112 and at least one turbine blade 114 fixedly secured to turbine shell 112; and lock-up clutch 116. Clutch 116 includes carrier plate 118 and clutch plate 120. Plate 118 is fixedly secured to cover 102 and includes protrusion 122 disposed in indentation 104. Clutch plate 120 is non-rotatably connected to plate 118 and axially displaceable with respect to carrier plate 118.

By "non-rotatably connected" elements, we mean that: the elements are connected so that whenever one of the elements rotates, all the elements rotate; and relative rotation between the elements is not possible. Radial and/or axial movement of non-rotatably connected elements with respect to each other is possible, but not required.

Indentation 104 and protrusion 122 extend in circumferential direction CD. Cover 102 includes interior surface 124. Portion 124A of interior surface 124 faces turbine 110 in axial direction AD1. Indentation 122 extends into portion 124A in axial direction AD2, opposite axial direction AD1. In an example embodiment, portion 124A is orthogonal to axis of rotation AR. The disposition of indentation 104 in protrusion 122 fixes a radial position of plate 118 with respect to cover 102.

Carrier plate 118 is welded to cover 102 at indentation 104. For example, welded area 126 is shown in FIG. 3. Line L1 orthogonal to axis of rotation AR passes through indentation 104 and protrusion 122. Line L2, parallel to axis AR passes through 104 indentation, protrusion 122 and area 126.

In an example embodiment, lock-up clutch 116 includes carrier plate 128 radially inward of the carrier plate 118. Clutch plate 120 is axially displaceable with respect to plate 128. In an example embodiment, torque converter 100 includes torsional vibration damper 130 including input component 132 non-rotatably connected to plate 128.

In an example embodiment, cover 102 includes protrusion 134, for example, resulting from formation of indentation 104, and line L2 passes through protrusions 122 and 134. In an example embodiment, clutch 116 includes clutch plate 136; friction plates 138 interleaved with plates 120 and 136; and blocking plate 140 fixed to plate 118. Plate 136 is non-rotatably connected to plate 118 and axially displaceable with respect to plate 118. Plates 138 are non-rotatably connected to plate 128 and axially displaceable with respect to plate 128.

Figure 4:
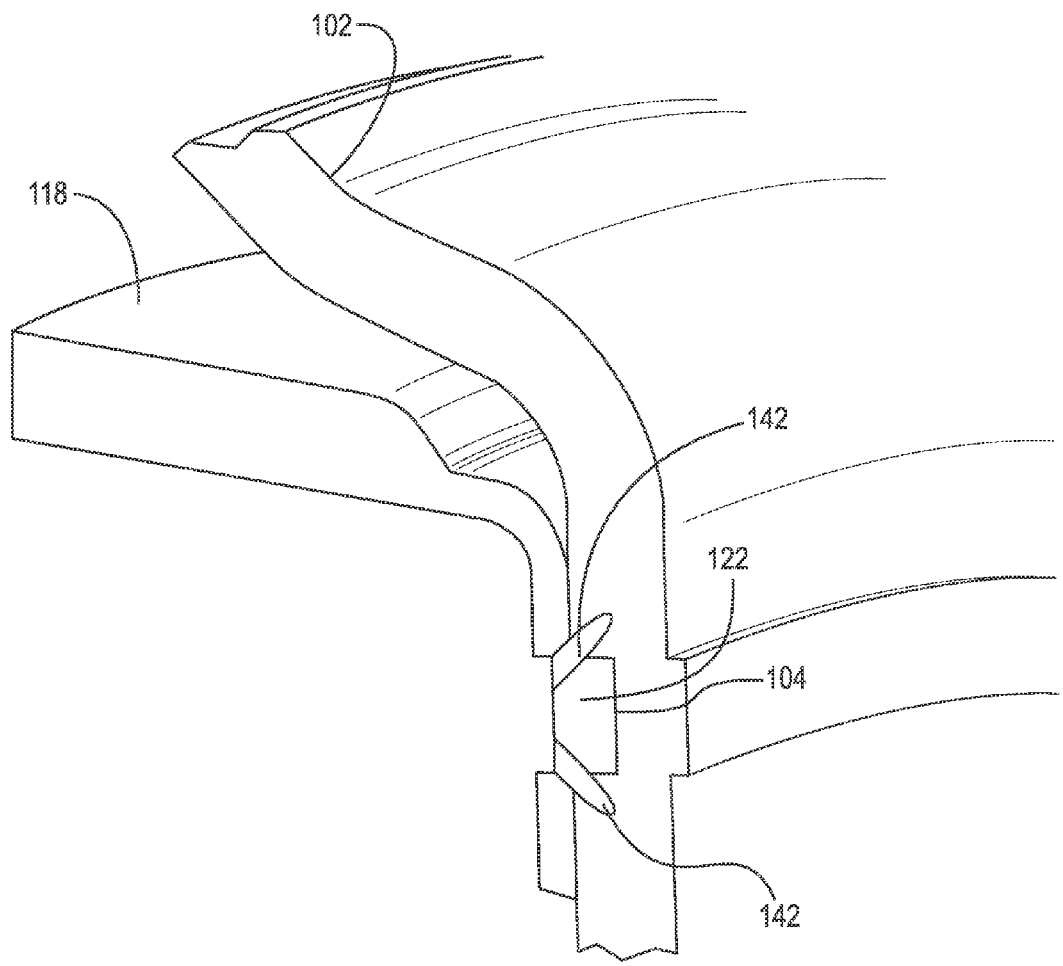
FIG. 4 is a perspective view of the cover and carrier plate shown in FIG. 2; and, FIG. 5 is a partial cross-sectional view of a prior art torque converter.
Figure 5:
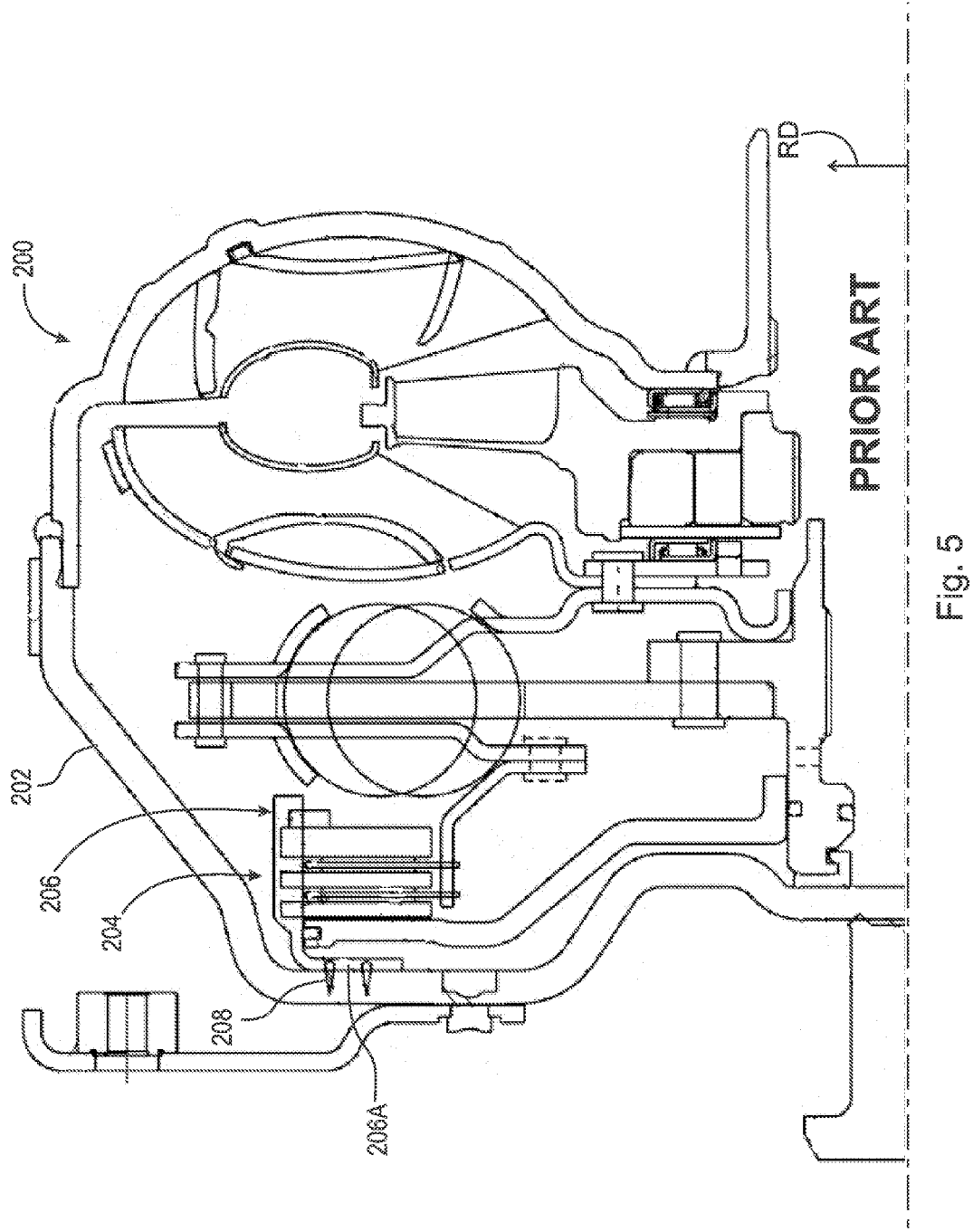

FIG. 4 is a perspective view of the cover and carrier plate shown in FIG. 2. FIG. 4 illustrates application of a welding beam at an angle with respect to an axial direction. In FIG. 3, a welding beam, for example a laser welding beam, was applied parallel to axis AR to form welded region 126. In FIG. 4, a welding beam was applied at an angle to axis AR to form welded regions 142.

In an example embodiment, indentation 104 and protrusion 122 are formed before plate 118 is positioned on cover 102. In an example embodiment, plate 118 is positioned against cover 102 and protrusion 122 and indentation 104 are formed by a same operation.

In an example embodiment (not shown), protrusion 122 is formed on a radially innermost portion of plate 118 and forms a radially innermost edge of plate 118.

Advantageously, torque converter 100 and plate 118 of clutch 116 address the problems noted above. Indentation 104 is accurately placed in cover 102 according to the desired position for plate 118 and the insertion of protrusion 122 ensures that plate 118 is in the desired position. Further, the interlocking of protrusion 122 with indentation 104 ensures that plate 118 remains in the desired location during welding operations.

The configuration of indentation 104 and protrusion 122 also address the problem of shearing forces noted above and enables a stronger weld between plate 118 and cover 102. The interlocking of indentation 104 and protrusion 122 provides structure that resists force in direction RD and counters shearing force in direction RD. Thus, welded regions 126 and 142 are reinforced. In the example of FIG. 4, because corners 144 and 146 are closer together than surfaces 148 and 150, better melting of plate 118 and cover 102 is enabled by welded regions 142.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:
1. A torque converter, comprising:
an axis of rotation;
a cover arranged to receive torque from an engine and including:
a first protrusion;
an interior surface; and,
a first indentation in the interior surface;
an impeller shell fixedly secured to the cover;
at least one impeller blade fixedly secured to the impeller shell;
a turbine including a turbine shell and at least one turbine blade fixedly secured to the turbine shell; and,
a lock-up clutch including:
a first carrier plate fixedly secured to the cover and including a second protrusion disposed in the first indentation; and,
a clutch plate non-rotatably connected to the first carrier plate, wherein:
the interior surface faces the turbine in a first axial direction parallel to the axis of rotation;
the first indentation extends from the interior surface in a second axial direction, opposite the first axial direction;
the first protrusion extends in the second axial direction; and,
a line parallel to the axis of rotation passes through, in sequence: the second protrusion, the first indentation and the first protrusion.
2. The torque converter of claim 1, wherein the first indentation extends in a circumferential direction.
3. The torque converter of claim 1, wherein a portion of the interior surface is orthogonal to the axis of rotation.

4. The torque converter of claim 1, wherein the first carrier plate is welded to the cover at the first indentation.

5. The torque converter of claim 1, wherein a line orthogonal to the axis of rotation passes through the first indentation and the second protrusion.

6. The torque converter of claim 1, wherein the lock-up clutch includes:
a second carrier plate radially inward of the first carrier plate; and,
a friction plate non-rotatably connected to the second carrier plate and axially displaceable with respect to the second carrier plate.

7. The torque converter of claim 6, further comprising:
a torsional vibration damper including an input component, wherein the second carrier plate is fixedly connected to the input component.

8. The torque converter of claim 1, wherein:
the first carrier plate includes a second indentation; and,
a line parallel to the axis of rotation passes through the first indentation and the second indentation.

9. A torque converter, comprising:
an axis of rotation;
a cover arranged to receive torque from an engine and including:
a first protrusion;
an interior surface; and,
an indentation extending in a circumferential direction;
an impeller shell fixedly secured to the cover;
at least one impeller blade fixedly secured to the impeller shell;
a turbine including a turbine shell and at least one turbine blade fixedly secured to the turbine shell; and,
a lock-up clutch including:
a first carrier plate fixedly secured to the cover and including a second protrusion disposed in the indentation; and,
a clutch plate non-rotatably connected to the first carrier plate, wherein:
a portion of the interior surface faces the turbine in a first axial direction parallel to the axis of rotation;
the indentation extends from the interior surface in a second axial direction, opposite the first axial direction;
the first protrusion extends in the second axial direction; and,
a line parallel to the axis passes through, in sequence, the second protrusion, the indentation and the first protrusion.

10. The torque converter of claim 9, wherein the portion of the interior surface is orthogonal to the axis of rotation.

11. The torque converter of claim 9, wherein the first carrier plate is welded to the cover at the indentation.

12. The torque converter of claim 9, wherein a line orthogonal to the axis of rotation passes through the indentation and the second protrusion.

13. The torque converter of claim 9, wherein the lock-up clutch includes:
a second carrier plate radially inward of the first carrier plate; and,
a friction plate non-rotatably connected to the second carrier plate and axially displaceable with respect to the second carrier plate.

14. The torque converter of claim 13, further comprising:
a torsional vibration damper including an input component, wherein the second carrier plate is fixedly connected to the input component.

15. A torque converter, comprising:
an axis of rotation;
a cover arranged to receive torque from an engine and including:
a first protrusion;
an interior surface; and,
an indentation;
an impeller shell fixedly secured to the cover;
at least one impeller blade fixedly secured to the impeller shell;
a turbine including a turbine shell and at least one turbine blade fixedly secured to the turbine shell; and,
a lock-up clutch including:
a first carrier plate including a second protrusion disposed in the indentation; and,
a clutch plate non-rotatably connected to the first carrier plate, wherein:
a portion of the interior surface faces the turbine in a first axial direction parallel to the axis of rotation;
the indentation extends from the interior surface in a second axial direction, opposite the first axial direction;
the first protrusion extends in the second axial direction;
a line parallel to the axis of rotation passes through, in sequence: the second protrusion, the indentation and the first protrusion; and,
the second protrusion being disposed in the indentation fixes a radial position of the first carrier plate with respect to the cover.

16. The torque converter of claim 15, wherein the first carrier plate is welded to the cover at the indentation.

17. The torque converter of claim 15, wherein the lock-up clutch includes:
a second carrier plate radially inward of the first carrier plate; and,
a friction plate non-rotatably connected to the second carrier plate and axially displaceable with respect to the second carrier plate.

* * * * *